United States Patent [19]

Linder

[11] Patent Number: 5,059,902
[45] Date of Patent: Oct. 22, 1991

[54] ELECTROMAGNETIC METHOD AND SYSTEM USING VOLTAGE INDUCED BY A DECAYING MAGNETIC FIELD TO DETERMINE CHARACTERISTICS, INCLUDING DISTANCE, DIMENSIONS, CONDUCTIVITY AND TEMPERATURE, OF AN ELECTRICALLY CONDUCTIVE MATERIAL

[76] Inventor: Sten Linder, Box 133, S-150 13 Trosa, Sweden

[21] Appl. No.: 340,626
[22] PCT Filed: Oct. 9, 1987
[86] PCT No.: PCT/SE87/00457
 § 371 Date: Mar. 27, 1989
 § 102(e) Date: Mar. 27, 1989
[87] PCT Pub. No.: WO88/02842
 PCT Pub. Date: Apr. 21, 1988

[30] Foreign Application Priority Data
 Oct. 10, 1986 [SE] Sweden .................. 8604315

[51] Int. Cl.⁵ .............. G01B 7/00; G01N 27/72; G01R 33/12; G01F 23/26
[52] U.S. Cl. .............. 324/207.17; 324/204; 324/207.23; 324/229; 324/232; 324/239; 324/243; 73/290 R
[58] Field of Search .............. 324/326–329, 324/336, 207, 229–234, 239–243, 67, 204, 207.16, 207.17, 207.26; 73/290 R; 374/163

[56] References Cited
U.S. PATENT DOCUMENTS

| 3,315,155 | 4/1967 | Colani | 324/336 X |
| 3,707,672 | 12/1972 | Miller et al. | 324/239 |
| 4,600,356 | 7/1986 | Bridges et al. | 324/336 X |
| 4,717,006 | 1/1988 | Chapman et al. | 324/239 X |
| 4,814,703 | 3/1989 | Carr et al. | 324/227 X |
| 4,843,319 | 6/1989 | Lara | 324/229 X |
| 4,843,320 | 6/1989 | Spies | 324/229 X |

FOREIGN PATENT DOCUMENTS

| 0096078 | 12/1983 | European Pat. Off. |
| 151383 | 9/1920 | United Kingdom |
| 1315684 | 5/1973 | United Kingdom | 324/336 |

Primary Examiner—Gerard R. Strecker
Attorney, Agent, or Firm—Sughrue, Mion, Zinn Macpeak & Seas

[57] ABSTRACT

A method for contactless measuring the values of magnitudes which relate to an electrically conductive material in solid or liquid form, for instance such magnitudes as the distance of the conductive material from a given point, linear dimension(s) of a body that incorporates such material, the electrical conductivity value of the material, and the temperature of the material. In accordance with the method, an electromagnetic field, generated with the aid of a constant current which flows through at least one field generating coil, is caused to penetrate at least partially into the material. The supply of current to the at least one coil is discontinued subsequent to the magnetic field having penetrated the electrically conductive material to an extent sufficient for the intended magnitude to be measured. The voltage which is induced in at least one sensing coil located in the magnetic field as a result of the decaying magnetic field is then sensed and utilized to determine the value of the intended magnitude. The field generating coil is preferably also used as the voltage sensing coil, and the value of the intended magnitude is determined by analyzing the time variation of the induced voltage. The invention also relates to a measuring system for carrying out the method.

20 Claims, 6 Drawing Sheets

ELECTROMAGNETIC METHOD AND SYSTEM USING VOLTAGE INDUCED BY A DECAYING MAGNETIC FIELD TO DETERMINE CHARACTERISTICS, INCLUDING DISTANCE, DIMENSIONS, CONDUCTIVITY AND TEMPERATURE, OF AN ELECTRICALLY CONDUCTIVE MATERIAL

BACKGROUND OF THE INVENTION

The present invention relates to a method for measuring the values of parameters relating to an electrically conductive material in solid or liquid form, such as the distance of an electrically conductive material from a given point, linear dimensions of a body incorporating the conductive material, the temperature of the material, or its electrical conductivity; and in which method an electromagnetic field is caused to penetrate the electrically conductive material at least partially. The invention also relates to a measuring system for carrying out the method.

The electrically conductive material should be at least substantially non-magnetic, for instance a metal billet or bloom in the process of being rolled, a metal rod during a drawing operation, a machined metal product during the process of inspecting the object and making material checks, a cast metal ingot in a continuous casting process, or a metal bath during a treatment process. The electrically conductive material is not limited to metals, but may comprise other materials of good electrical conductivity, such as graphite or a metal compound heated to a high temperature.

It is previously known to utilize a magnetic field for measuring the values of magnitudes of parametric values of the aforesaid kind in conjunction with electrically conductive materials. In this regard it is conventional practice to generate a sinusoidal alternating magnetic field in the close proximity of the electrically conductive material and to sense the influence of the material on the magnetic field, in the form of an induced change either in the coil which generates the magnetic field or in one or more separate sensing coils. When only one coil is used, there is detected or sensed the amplitude and/or the changes in phase across the coil. This means, however, that the change will be small in relation to the applied field or voltage, and hence it is difficult to obtain accurate measurements. Furthermore, with this kind of measuring process it is very difficult to differentiate between the influences exerted by variations in two or more mutually different parameters. The use of one or more separate sensing coils will, to a certain extent, overcome the problem that the change induced constitutes only a small part of the fundamental signal. However, the geometrical arrangement of the coils presents a problem which often results in inaccurate sensing. Furthermore, the difficulty experienced in differentiating between the influence exerted by variations of two parameters at one and the same time is also encountered in this case, while it is impossible to differentiate between variations of three parameters at the same time, since only two measurement parameters, phase and amplitude, can be measured.

Also described in the literature are coil arrangements which generate a sinusoidal field in accordance with the aforegoing and which are geometrically formed in a particular manner so as to obtain increased sensitivity or response to one magnitude and decreased sensitivity or response to the other. This provides for some degree of demarcation between the different parameters, but the arrangements are complicated and are sensitive to variations in geometry.

Powerful direct-current magnetic fields have previously been used in conjunction with measuring the magnetic properties of an electrically conductive material. The purpose of this powerful d.c. magnetic field is to change the magnetic properties of the material, i.e. to magnetize and demagnetize the object to be measured. Consequently, the method will not function with non-magnetic materials.

The Swedish Patent Applications 76057603, 7605759, 7605761 and 77104818 teach systems and coil configurations for electro-magnetically measuring parameters according to the above in conjunction with liquid, electrically conductive materials heated to high temperatures. Although the measuring systems described in these documents have been found to function well in practice, there remains a large number of applications or fields in which the demands on accuracy and the possibility of measuring a number of varying parameters independently of one another are not satisfied.

SUMMARY OF THE INVENTION

Consequently, the object of the present invention is to provide a novel method and a novel measuring system for measuring magnitudes of parametric values of the aforesaid kind which are not encumbered with the drawbacks of know systems and which will also enable totally new applications to be undertaken.

This object is achieved with a method of the kind described in the introduction which is characterized by generating the electromagnetic field with the aid of a constant current flowing through at least one field-generating coil; by discontinuing the current supply to the coil when the field has penetrated the electrically conductive material to an extent sufficient to effect the intended measuring process; and by subsequently sensing the voltage which is induced in at least one sensing coil located in the magnetic field as a result of the decaying magnetic field, and utilizing this sensed voltage to determine the value of a specific magnitude.

According to one preferred embodiment the coil used to sense the induced voltage is the field generating coil.

The parameters are preferably determined by analysing the variations in time of the induced voltage.

Other characteristic features of the method and the characteristic features of a measuring system for carrying out the method are set forth in the following method and system claims.

The length of time over which the magnetic field is generated depends on the parameters to be measured and the nature of the material concerned, as will be described in more detail hereinafter with reference to the drawings.

It has been found, considered as a first approximation, that the reason why the voltage is induced in the coil when the supply of field-generating current is switched off, is due to the slow decay time of the magnetic field which has penetrated the material in the presence of the current. The voltage induced in the coil therewith occurs as a result of the change in the magnetic field which collapses in the material and decays with time. The magnitude of this time-change and therewith the voltage generated in the coil is, at mutually different points of time, clearly contingent on the aforesaid parameters values to be measured, such that the extent of the change which takes place over short time periods, will determine the dimensions of the material or the distance of the material from a given point, or a linear dimension, whereas the extent of the changes taking place over time periods of average lengths determine the electrical conductivity of the material, and the extent of the change that takes place over long time periods will determine material thickness. The following description, made with reference to the drawings, discloses how this can be put to practical use.

BRIEF DESCRIPTION OF THE DRAWINGS

The invention will now be described in more detail with reference to a number of exemplifying, non-limiting embodiments thereof and with reference to the accompanying drawings, in which like parts have been identified by like references.

DETAILED DESCRIPTION OF THE PREFERRED EMBODIMENTS

Figure 1:
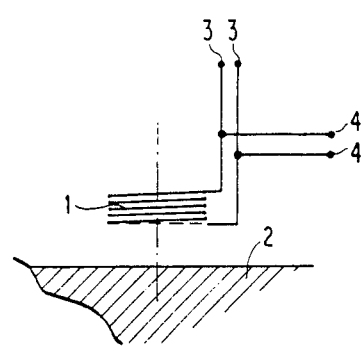
FIG. 1 is a schematic illustration of the principle operation of the measuring system, according to the invention.
Figure 2:
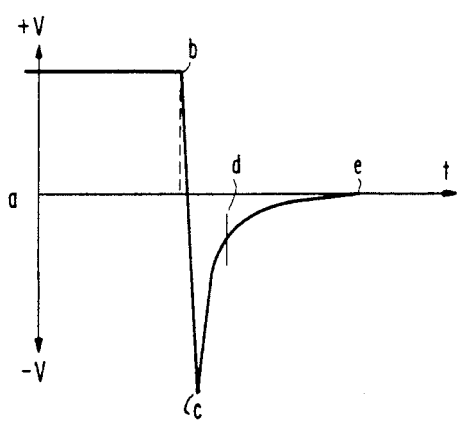
FIG. 2 is a diagram which illustrates the voltage across the common-purpose field-generating and voltage-sensing coil of FIG. 1 as a function of time.

FIG. 1 is a schematic illustration of a coil 1 placed over an electrically conductive material 2, and FIG. 2 is a diagram which illustrates schematically the voltage/time-lapse relationship utilized in accordance with the invention. These Figures are primarily intended to show the manner in which the invention works, and the various time phases will each be described separately in the following, step by step.

Referring to FIG. 2, at time a voltage is applied across the terminals 3 of the coil 1, so that a constant current will flow through the coil 1. This voltage is shown in FIG. 2 by means of a line drawn horizontally between time points a and b. The magnetic field generated by the current passing through the coil 1 propagates with time into the electrically conductive material 2, via a diffusion-like process. After a certain period of time has elapsed, the magnetic field will have totally penetrated the material as a result of this propagation, such that essentially no further changes in the magnetic field strength in the material will occur. This time lapse is contingent on the electrical conductivity of the material 2 being measured and also on the size of the coil, such that when the material is a highly conductive material and the coil is large, the time lapse is long, whereas when the material has low conductivity and the coil is small the time lapse will be short. The length of time which needs to pass before switching-off supply voltage so as to cause the magnetic field to collapse depends on the particular parameter to be measured. When this parameters pertains to linear dimensions or distance, relatively short time lapses are chosen, which is also the case when measuring the thickness of thin material. Relatively long time lapses are employed when measuring the electrical conductivity and thickness of thick materials.

For the purpose of describing the invention clearly, so that it can be readily understood, it has been considered beneficial here to use a natural picture in which the magnetic field surrounding an excited coil can be considered to be divided into two fields in the presence of an electrically conductive material, namely one field in the air around the coil and one field which extends through the electrically conductive material, which fields, when switching off the current which generates the magnetic fields, decay or collapse across the coil and induce a voltage therein.

The time b shown in the FIG. 2 diagram is the time at which the supply voltage across the coil 1 is switched-off and the respective magnetic fields present in the air around the coil and in the electrically conductive material collapse and decay through the coil 1 and induce therein a counter-voltage which is taken out at the terminals 4 (FIG. 1). The voltage thus becomes negative shortly after discontinuing the supply current or voltage. The magnetic field present in the air around the coil 1 collapses very rapidly, over a typical time period of 0.3–3 microseconds, and gives rise to a high negative voltage, during this time period, i.e. between time b and time d with a maximum negative signal at time c. During the following time period from time d to time e, the magnetic field present in the conductive material decays more slowly across the coil 1 and produces therein a less negative signal, which, however, endures over a longer period of time. It has been found expedient for the aforesaid purpose to consider that the magnetic field will diffuse from the electrically conductive material with time and discharge or decay across the coil, so as to have left the material completely at time e.

The time taken for the magnetic field to diffuse completely from the material, i.e. the time lapse from time b to time e, is of the same order of magnitude as the time taken for the magnetic field to enter said material from the time of generating the magnetic field, i.e. from time a to time b, and is thus also contingent on the electrical conductivity of the material and the size of the coil. It can be mentioned by way of example that the time taken to effect complete discharge or decay in the case of highly conductive materials, such as copper, and coil sizes (diameters) in the region of 20 mm is from 0.5 to 2 milliseconds, and for coil sizes in the region of 50 mm from 1.5 to 5 milliseconds. In the case of materials having poor conductivity, e.g. hot steel, and coil sizes around 20 mm corresponding times are 0.05–0.3 milliseconds and for coil sizes around 50 mm from 0.15 to 0.7 milliseconds.

If the material 2 is brought closer to the coil 1, that part of the magnetic field present in the air around the coil becomes smaller, whereas that part of the field present in the electrically conductive material becomes larger. Consequently, the voltage between b and d falls and is increased to a corresponding extent between d and e.

If there is used instead a highly conductive material which lies at the same distance from the coil as in FIG. 1, the voltage is not changed between b and d, since the part of the field present in the air is not changed. Because of the higher electrical conductivity of the material used, however, the diffusion of the magnetic field within the material takes place more slowly. Accordingly, the voltage/time lapse changes so that the voltage at time d is lower than the voltage at time e and the latter voltage occurs at a correspondingly later point in time.

Figure 3:
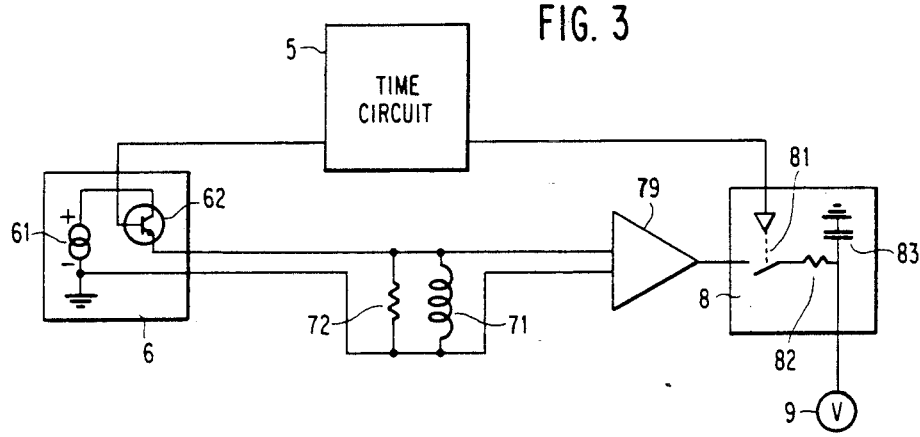
FIG. 3 is a schematic diagram of a first embodiment of the invention.
Figure 4A:
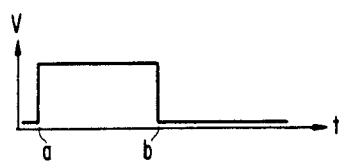
FIGS. 4A and 4B are diagrams which illustrate voltage pulses utilized in the FIG. 3 schematic.
Figure 4B:
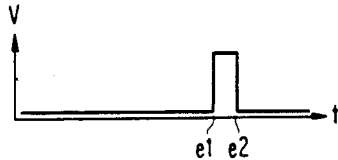

The system illustrated in FIG. 3 includes a coil 71, which corresponds to the coil 1 in FIG. 1. This coil is supplied with current over a time period of a to b, cf FIG. 4A, with voltage from a block 6 which includes a constant voltage source 61 and a suitable cut-out switch, e.g. a transistor 62. The transistor is controlled by a time circuit 5 in accordance with the diagram in FIG. 4A. A resistor 72 serves as a discharge resistance, the magnitude of which gives the time period b to d in the FIG. 2 diagram. If a time period of 4 microseconds is desired, which has been found a suitable value when measuring metals of normal electrical conductivity, this resistance should be in the order of 100 ohms, although this will depend on the electrical values of the coil. The voltage across the coil is measured subsequent to amplification in an amplifying circuit 79 in accordance with known techniques. The voltage is then processed in a circuit 8 which essentially includes a cut-out switch 81, which is open during that period when no measurements are to be made and which closes the signal transmission line when measurements are to be made. The switch 81 may be, for example, a so-called analogue switch and is controlled by the time circuit 5 in accordance with the FIG. 4B diagram, i.e. so that a voltage is produced between those time periods e1–e2 over which measurements are to be made. During the time when measuring takes place, i.e. when the switch 81 is activated, i.e. switched on, there is formed a mean value of the signal, either by using an RC-filter which includes a resistor 82 and a capacitor 83, or by integration during the time period e1 to e2. The voltage during the time period e1 to e2 can then be measured as a d.c. voltage with a voltmeter 9, or can be used for further signal processing.

The method for measuring the three parameters, distance (linear dimension), electrical conductivity, and wall thickness will be described below with reference to the diagrams in FIGS. 5A–C. The diagram 5A illustrates changes in induced voltage with changes in distance (or in linear dimensions), the diagram 5B illustrates changes in induced voltage with changes in electrical conductivity, and FIG. 5C illustrates changes in induced voltage with changes in wall thickness.

Figure 5A:
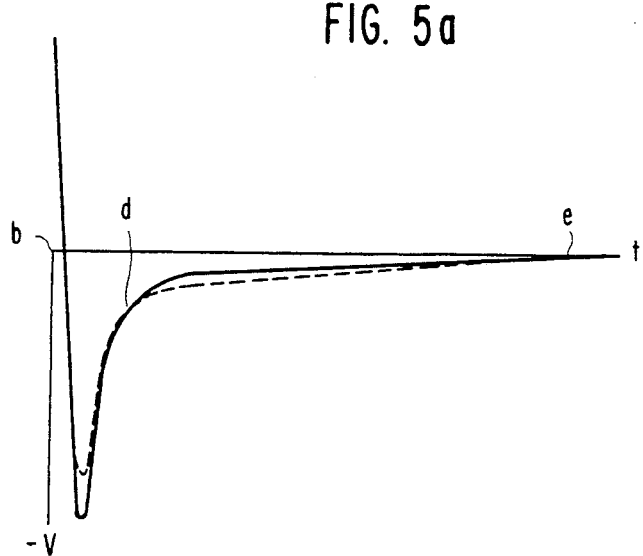
FIGS. 5A–5C illustrate the induced-voltage/time changes caused by changes in different parameters.

In FIG. 5A the full-line curve in the voltage/time-lapse diagram for the period following the time at which the voltage supply was cut-off illustrates the conditions that prevail in an imagined normal state when the conductive material is located at a given distance from a coil, whereas the broken-line curve illustrates the conditions that prevail when the material is located at a shorter distance from the coil. During the time period b to d the magnetic field in the air around the coil discharges and since this part of the magnetic field becomes smaller when the coil is located closer to the material, the voltage will also decrease during this time period. The part of the magnetic field present in the conductive material will decay during the time period d to e, this part of the field increasing to the same extent as the air field decreases when the material is located nearer the coil. The integral of the voltage prevailing between time b and time d and the integral of the voltage prevailing between time d and time e constitute mutually independent measurements of the distance between the coil and the material. Furthermore, the sum of the changes of these two integrals is equal to zero, which can be used to check the truth of the measurement. The values of these two integrals are essentially independent of variations in other parameters, thereby affording the possibility of measuring distance (or linear dimensions) independently of other varying parameters. Furthermore, it is possible to obtain extremely precise and reliable measurements due to the possibility of carrying out two mutually independent measuring processes at one and the same time and of checking that the sum of the changes of the two integrals is zero, i.e. the sum of integrals shall be constant.

According to the aforegoing, the time period from time b to time d is of the order of 0.3–3 microseconds, but is dependent on the electrical data of the coil and the discharge resistance. The time period d to e is of the order of 2 milliseconds in the case of material of good electrical conductivity and 0.2 milliseconds for a material of poor conductivity.

Figure 5B:
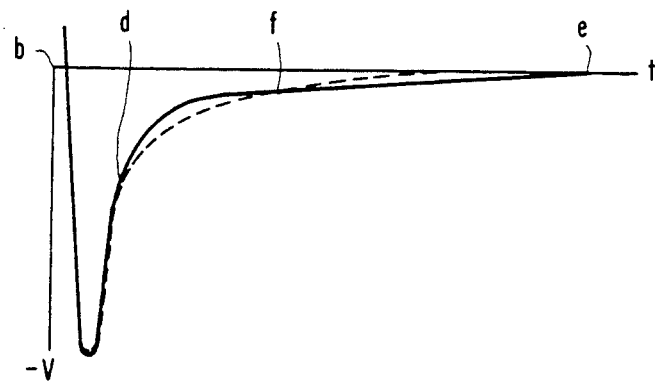
Figure 5C:
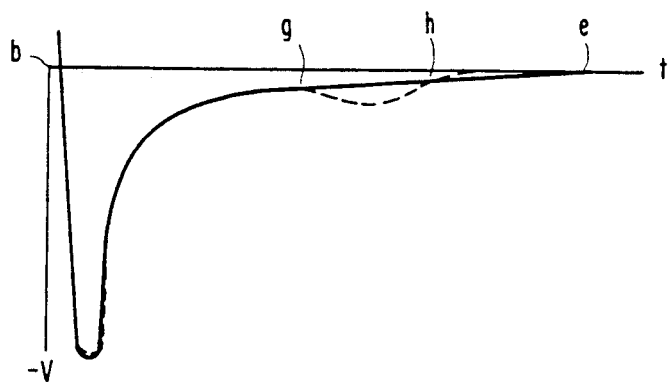

In FIG. 5B the full-line curve of the voltage/time diagram illustrates the sequence that takes place when measuring a material which has a given electrical conductivity, and the broken-line curve illustrates the sequence that takes place when measuring a material which is a poorer conductor of electricity than the former material and which is located at the same distance from the coil as said former material. As established in the aforegoing, the time period b to d is not affected by the change in conductivity but the magnetic field will diffuse more quickly from the material of lower conductivity. A major part of the magnetic field will therewith diffuse from the material during the time period d to f, which means that the magnetic field will disappear within a shorter space of time and that the time point e will occur earlier, when practically no magnetic field energy remains in the material. Consequently, the value of the integral from d to f will be greater and from f to e smaller when electrical conductivity decreases and vice versa. The value of the integral from d to f and the value of the integral from f to e thus constitute measurements of the electrical conductivity of the material, while at the same time the sum of the changes in the integrals is zero.

The electrical conductivity can therefore be measured independently of other parameters on the basis of the relationship between the above mentioned two integrals, or by determining the value of one or both of said integrals and compensating for variations in distance with the aid of the measurement value obtained in accordance with FIG. 5A. This enables electrical conductivity to be measured independently of other varying parameters. Furthermore, measurements can be made with great accuracy as a result of the availability of two independent measuring values, and also with great reliability due to the possibility of checking that the sum of the integrals is constant.

The time lapse from time d to time f depends on the size (diameter) of the coil and on the electrical conductivity of the object being measured, but a time lapse of 1 millisecond can be mentioned by way of example in the case of copper and a coil size of 40 mm.

In FIG. 5C the full-line curve of the voltage/time diagram represents measurement carried out on thick-walled material (e.g. metal plate), whereas the broken-line curve represents the measurement of a thinner wall. It is found that the two walls have constantly the same voltage/time characteristic up to the time point g. In comparison with the thicker wall, the thinner wall then produces a higher voltage up to the time point h and then lower voltage up to the time point e. This can also be understood from the aforesaid picture since the thicker wall presents a longer diffusion path than the thinner wall and therewith a longer magnetic field diffusion time. The integral from time g to time h can be used as a measurement of the thickness of the material, since a thinner material will give a greater value than a thicker material. The integral from time h to a time e, is a further measurement of the thickness of the material, since in this case a thinner material will give a lower value than a thicker material. The sum of these two integrals is constant and may be used to check the measurement also in this case.

The times g and h are contingent on the thickness of the material and its electrical conductivity. It can be mentioned by way of example that in the case of 4 mm thick copper plate, the time g is of the order of 0.5 millisecond and time h is of the order of 1.0 millisecond.

Thus, there is provided a method of measuring wall thickness independently of other varying parameters, since the relationship between the aforesaid two integrals is independent of variations in electrical conductivity and of the distance between material and coil. Furthermore, solely the value of one or both of integrals may be determined and the dependency which is then obtained from other magnitudes removed, since these magnitudes are known from the values determined in accordance with FIGS. 5A and 5B.

The method can also be applied by the steps of dividing the voltage/time-lapse into different time periods in accordance with the aforegoing, integrating the voltages during these time periods, analysing the results and calculating the various magnitudes concerned with the aid of the general picture given in the aforegoing.

Figure 6:
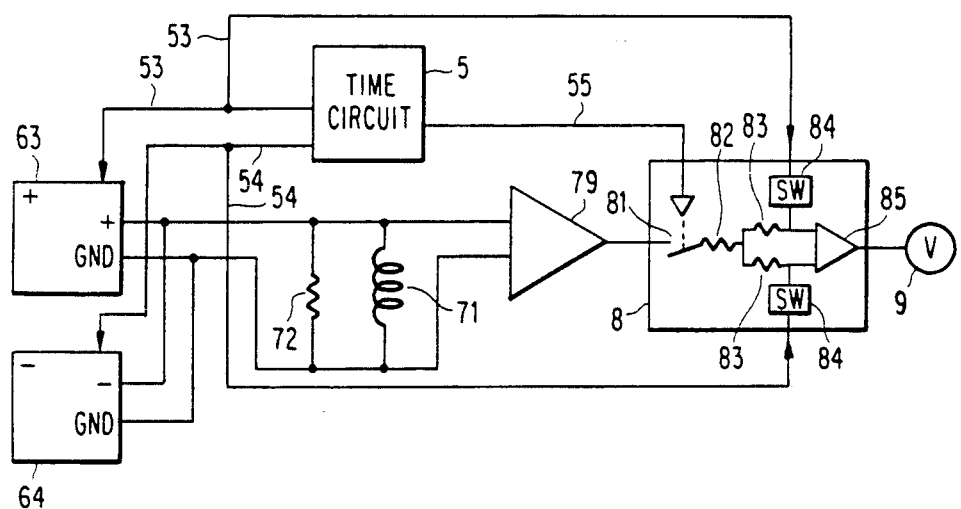
FIG. 6 is a diagrammatic illustration of a second embodiment of the system according to the invention.
Figure 7:
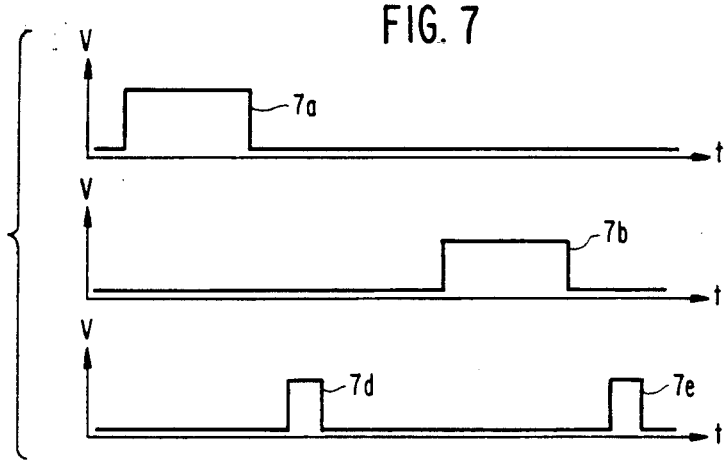
FIG. 7 shows three diagrams which illustrate voltage pulses utilized in the FIG. 6 illustration.

FIG. 6 is a schematic block diagram which illustrates a second embodiment of the invention, according to which both a positive and a negative voltage are used to generate a magnetic field. In this case a positive voltage is generated across the coil 71 with the aid of a generator circuit 63 which is controlled from the control circuit 5 by a control voltage 7a which is applied on a conductor 53 and the time phase of which is shown in the top diagram of FIG. 7. A corresponding negative-voltage generating circuit 64 is controlled via a conductor 54 which delivers control voltage 7b for producing negative current during a period in which the positive side is inactive and in which no measurement is made. An example of one such time phase is shown by the centre diagram of FIG. 7. This will mean that the voltage on one side of the coil 71 will be positive-0-negative-0. As with the earlier embodiment, the reference 72 identifies a discharge resistor and the signal is also in this case amplified in an amplifying circuit 79.

Similarly to the embodiment earlier described, the signal processing circuit 8 of this embodiment also incorporates a switch 81 which is controlled by the control circuit 5 via a signal conductor 55 which will only supply voltage during the time in which measurement is to be made. An example of one such time phase is shown by phases 7d, 7e in the bottom diagram of FIG. 7. The signal is then sent to an integrator 82, which integrates the signal during the measuring phase. The polarity of the signal is then changed alternately, so that the positive and the negative signal measurement obtain different polarities. This is achieved by applying the signal, via resistor 83, to both the positive and the negative amplification input of a differential amplifier 85. A respective circuit 84 connected to each of said inputs connects the inputs alternately to earth, controlled by the time circuit 5 over signal conductors 53 and 54. The amplifier 85 also generates a mean value. Thus, the voltage measured by the measuring circuit 9 during the positive period is negative and is also negative during the negative period, or vice versa, it being possible to add together the signals obtained during the two phases. The sequence illustrated in the diagrams of FIG. 7 can then be repeated any desired number of times and a mean value formed.

Figure 8:
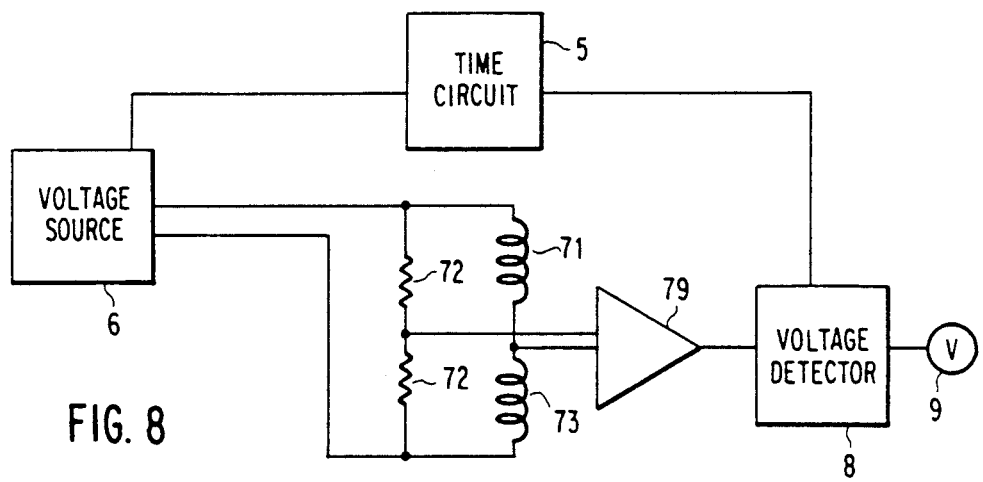
FIG. 8 is a diagrammatic illustration of a third embodiment of a measuring system according to the invention.

FIG. 8 illustrates a third embodiment of the invention. This embodiment utilizes two series-controlled coils 71 and 73 which, as before, are supplied from a generator circuit 6 controlled by a time control circuit 5. Two equally large discharge resistors 72 are connected across the coils. The midway point on the coils and the midway point between the resistors are each connected to a respective input of a differential amplifier 79. The amplifier output signal is sent to a signal processing circuit 8 and is measured in a circuit 9 in accordance with the aforegoing. The system illustrated in FIG. 8 is particularly suited for use when differences between two magnitudes are of interest, e.g. when wishing to compare a parameters with a known reference parameters or when wishing to measure the difference between the measurement values. In this case, the coil 71 is placed at the one measuring location and the coil 73 at the other measuring location. If the relationships are totally identical at the two measuring locations, the voltage/time curve will exhibit a zero voltage during the whole of the time phase, whereas if a deviation occurs at one of the measuring locations only this deviation will be shown in the voltage/time curve.

With reference to FIG. 5, this means that only the deviation between the full-line curve and the broken-line curve in each diagram will be shown. The relative change in the signal will therewith be very large and amplification errors in the circuits are eliminated.

Another important advantage gained when using the system illustrated in FIG. 8 is the elimination of the following problems. The voltage/time curve exhibits a high voltage at short periods of time, but a very low voltage at longer time periods. It is necessary to adapt the amplification to the highest voltage at the short time periods, so as not to saturate the amplification stages. Amplification at the longer time periods will therewith be too small and instability may arise. This problem is not found when using the system illustrated in FIG. 8, e.g. when measuring thickness, because only the difference between a reference parameters and a measurement parameters is sensed or detected.

Figure 9:
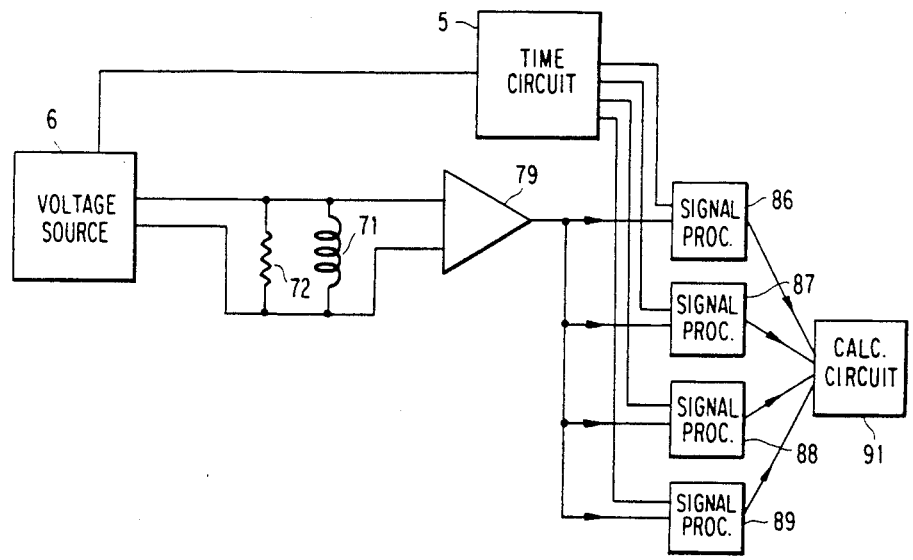
FIG. 9 is a diagrammatic illustration of a fourth embodiment according to the invention.

FIG. 9 illustrates a fourth embodiment of a system according to the invention, in which the generator circuit 6, the coil 71 and the discharge resistor 72 are similar to those of the earlier embodiments. In this embodiment, however, the control circuit 5 does not only control one signal processing circuit, but four such circuits 86, 88 and 89, all of which have mutually different time settings. The different measurement values are received by a circuit 91 which analyses said values and calculates the values of desired parameters. The FIG. 9 embodiment, optionally in combination with one of the previously described circuits, is intended for use when several parameters are to be measured independently of one another.

Non-limiting fields of application for the method and the system according to the invention will now be described with reference to FIGS. 10-16.

Figure 10:
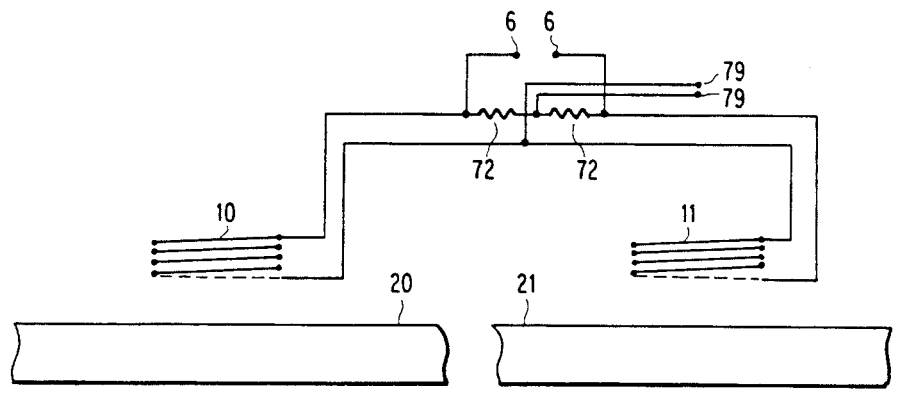
FIG. 10 is a schematic vertical, sectional view which illustrates a measuring system according to the invention used to determine the thickness of metal plate.

FIG. 10 illustrates the measurement of plate thickness. The inventive system used in this case includes two coils 10 and 11, each of which is located above a respective metal plate or metal plate section 20 and 21 whose thicknesses are to be measured. The plates or plate sections concerned may be plates or plate sections with which it is desired to measure the thickness differences between the two sides thereof or a plate and a reference plate of the desired thickness. In this case the measurements are carried out differentially and in accordance with FIG. 8. If remaining parameters can be kept constant during the measuring process, the measuring system according to FIG. 3 or FIG. 6 may be used. If the parameters cannot be held constant, then the measuring system according to FIG. 9 shall be used. Reference 72 in FIG. 10 identifies the aforementioned discharge resistor, reference 6 identifies the supply circuit, and reference 79 identifies the amplification circuit.

The difference in the thicknesses of the two metal plates or plate sections 20 and 21 is determined, in the simplest case, when remaining parameters, such as distance and electrical conductivity, are constant, departing from the relationship between the integrated values of the induced voltages during the time period from time g to time h or from time h to time e in accordance with FIG. 5C or both. The time g is typical of a good conductor such as copper, and is of the order of 1 millisecond for a 5 mm thick copper plate and 0.4 millisecond for a 3 mm thick plate. In the case of a poor conductor, such as hot steel plate, time g will be of the order of 0.1 millisecond for a 10 mm thick plate. In FIG. 5C the time g-h is of the order of 50% of time g and time e is determined by the size of the coil.

If large variations are found in the magnitudes distance and electrical conductivity parameters at the same time as accurate thickness measurements are desired, or if knowledge is desired of these parameters at one and the same time, there is preferably used a measuring system according to FIG. 9. In this case distance is measured with one channel in the time period that is close to the time at which the supply of generating current was discontinued, and electrical conductivity is measured with a later channel, therewith effecting compensation for variations in distance, and finally thickness is measured with a channel in the time suitable for measuring thickness in accordance with the above, while compensating for variations in distance and electrical conductivity.

Figure 11:
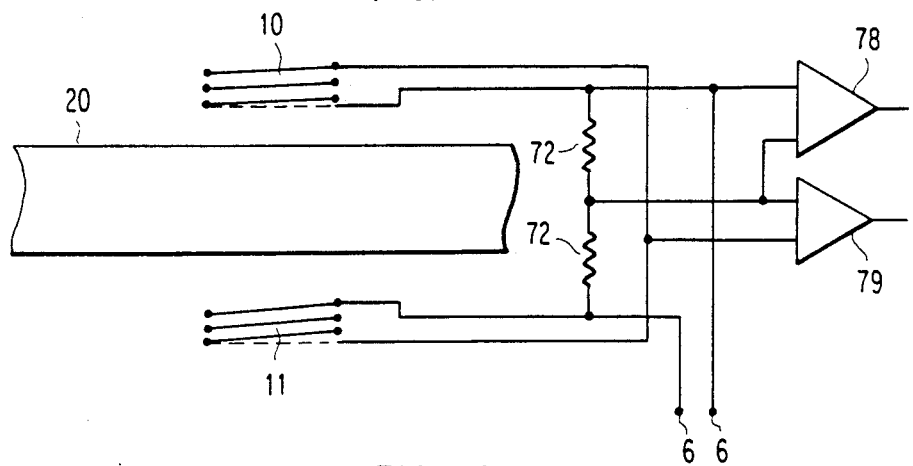
FIG. 11 is a schematic vertical, sectional view which illustrates the use of an inventive measuring system for distance measuring purposes and for measuring the electrical conductivity of a metal casting formed, e.g. in a continuous casting process.

FIG. 11 illustrates an inventive measuring system for use in measuring the electrical conductivity of a metallic object 20. The metallic object 20 may have the form of a continuous metal casting subsequent to being cast, a metal strip during the process of annealing, a metal sheet or strip in the process of being rolled, or a like metal object. By measuring the electrical conductivity of a metal object, it is possible to obtain important information relating to the temperature, hardness, and internal structure of the object, together with similar factors, which can be used subsequently to control preceding and/or subsequent processes. In this regard it is often of interest to sense both the electrical conductivity as a mean value and variations in electrical conductivity at various locations, e.g. on different sides of a metal strip.

This can be achieved in accordance with the invention by placing a respective coil 10 and 11 on each side of the elongated metal object to be measured, e.g. the aforesaid metal strip, continuous casting etc., and supplying the coils from a generator circuit 6 of the kind aforedescribed. The circuit has connected therein an amplifier 79 for measuring differentially between the midway point of the coils and the midway point of respective associated discharge resistances 72, and a further amplifier 78 is connected between the midway point of the resistors and one side of the coil pair. When the voltage across the coil 10 at a given moment is A and the voltage across the coil 11 at the same given moment is B, the amplifier 79 will then measure $A-(A+B)/2=B/2-A/2$, i.e. half the voltage difference across the coils. The amplifier 78 will measure the voltage across the coil 11, i.e. B, at the same given moment. Subsequent to processing the signal(s), the difference between the voltage across the amplifier 78 and twice the voltage across the amplifier 79 can be determined, in order to obtain the voltage across the coil 10. This enables the voltage across the two coils at any given moment to be measured separately, and to obtain an extremely accurate value of the difference between the two coils.

The measuring system illustrated in FIG. 11 thus enables parameters which are of interest in the technical processes to be measured. By measuring distances or linear dimensions in accordance with the principle discussed with reference to FIG. 5A and using stationary coils, it is possible to determine both the position and the linear dimension of the material. The electrical conductivity of the material can be measured a) absolutely, i.e. with the amplifier 78 and in accordance with FIG. 5B, and b) differentially in accordance with the above and FIG. 5B. When combined with the knowledge of the relationship between electrical conductivity and the intended parameter (temperature, hardness, etc.), this information can be used to control the processes concerned.

Figure 12:
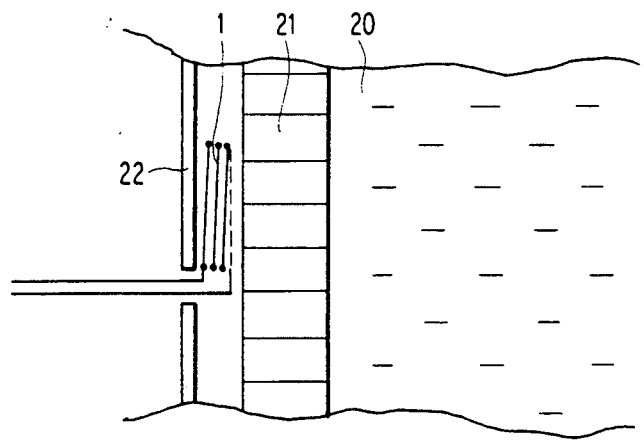
FIG. 12 is a schematic vertical, sectional view of an inventive measuring system used to measure wall thicknesses by measuring the distances of a molten metal bath from a given point.
Figure 13:
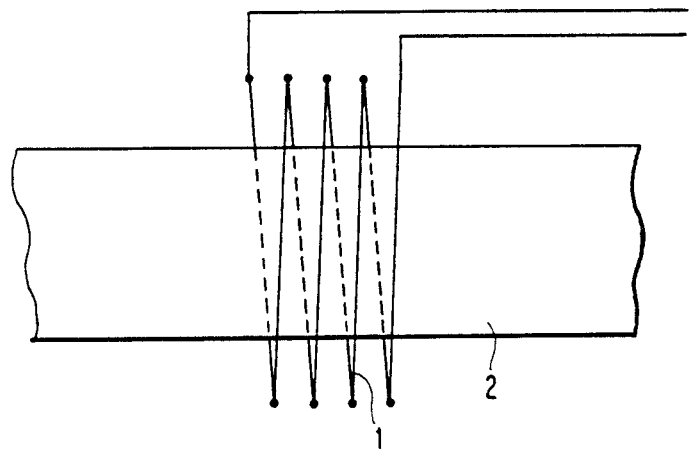
FIG. 13 is a schematic vertical, sectional view of an inventive system intended for dimension measuring purposes.

FIG. 12 illustrates an inventive measuring system used for measuring magnitudes in a molten metal bath. The reference 20 in FIG. 12 identifies a metal bath which is contained in a vessel which comprises an inner wall made of refractory material 21 and an outer wall 22 made of metal plate, preferably steel plate, spaced from the inner wall 21. A coil 1 of the aforesaid kind is placed in the space between the metal plate 22 and the refractory material 21 and connected to generator and measuring circuits in accordance with the aforegoing. In the case of treatment vessels of the kind illustrated in FIG. 12, it is often necessary to know the thickness of the refractory wall 21 and the electrical conductivity of the metal bath, since this latter magnitude is indicative of the alloying composition of the bath. The presence of the steel plate 22 constitutes a problem in cases such as this, since the plate temperature does not remain stable, or is not known, and variations in temperature affect the measuring signals. This is particularly critical when, for practical reasons, the steel plate is located close to the coil 1, wherewith the plate will radically influence the voltage/time-lapse relationship and therewith greatly affect the accuracy of the measurements made.

The influence exerted by the steel plate can be overcome, however, by using a measuring system according to FIG. 9 and adapting the times for the different measuring channels in a suitable manner. The basic reason why this is possible is because the voltage/time-lapse relationship of the steel plate is completely different to the voltage/time-lapse relationship of standard metal. The measuring times which should normally be used here for measuring distance (linear dimensions) and electrical conductivity according to FIGS. 5A and 5B are extended in this case, by dividing the time lapse between d and f according to FIG. 5B and/or between f and e, into two parts, wherewith the additional information obtained is used to compensate for the influence exerted by the steel plate, e.g. in a microprocessor or by some other means. Alternatively, or in addition hereto, measurement of the electrical conductivity of the bath can be monitored by summating the measurement results obtained from the time periods covering time d to time f and time f to time e, since in an undisturbed system these shall be equal to zero. This will not apply in the present case, however, due to the presence of the steel-plate wall. Nevertheless any deviation from zero can be used to compensate the other measurements that are made.

The system illustrated in FIG. 12 can be modified, by placing the coil 1 above the surface of the molten bath, so as to be able to determine the distance of the coil from the surface, and therewith the level of said surface in the vessel at a given moment in time.

In all of the embodiments described in the aforegoing there has been used a coil configuration in which the axis of symmetry of a coil extends at right angles to the measuring plane. It will be understood, however, that the method and measuring systems according to the invention can also be applied with other geometries, e.g. with the cylindrical geometry illustrated in FIG. 13. In this case the object 2 to be measured has the form of a rod, a pipe or the like which extends through the coil 1, parallel with the symmetry axis of the coil. The aforesaid magnitudes relating to distance, or more adequate linear dimensions, electrical conductivity and, e.g. the wall thickness of a pipe or tube, can also be measured in this case.

Figure 14:
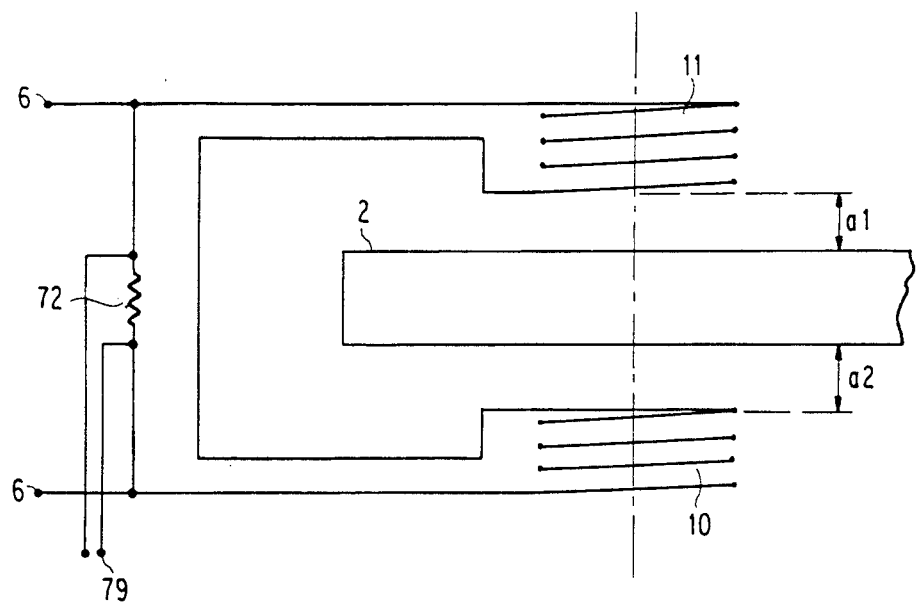
FIG. 14 is a schematic vertical, sectional view of an inventive system used for measuring plate thicknesses.

FIG. 14 illustrates an alternative system for measuring the thickness of metal plate from two opposing sides thereof. The system of this embodiment includes two series-connected coils 10 and 11, each of which is located on a respective side of the metal plate to be measured. Similar to the embodiments earlier described, the coils are supplied from a generator circuit 6 and discharged across a resistor 72. The voltage is measured with an amplifier 79 and is further processed in accordance with the aforegoing. With this system, each coil is instrumental in measuring the distance from a given point on the coil to the opposing surface of the plate 2, i.e. the coil 10 is instrumental in measuring the illustrated distance a2 and the coil 11 in measuring the illustrated distance a1. Since the coils are connected in series, the two distances a2 and a1 will be summated and when the sensed distance between the coils is a3 the thickness T of the plate will equal a3-a1-a2.

If there is a change in the position of the plate 2 in the space between the coils, the distance a1 will become either shorter or greater and the distance a2 will alter accordingly, wherewith the above expression relating to plate thickness remains unchanged. The voltages which represent the distances a1 and a2 do not change linearly with the distance, so that when, e.g. a1 increases the associated signal changes to the same extent as when a2 decreases. Consequently, the voltage measured by the amplifying circuit 79 is linearly dependent on the distances a1 and a2 and thus on the thickness of the plate.

Figure 15:
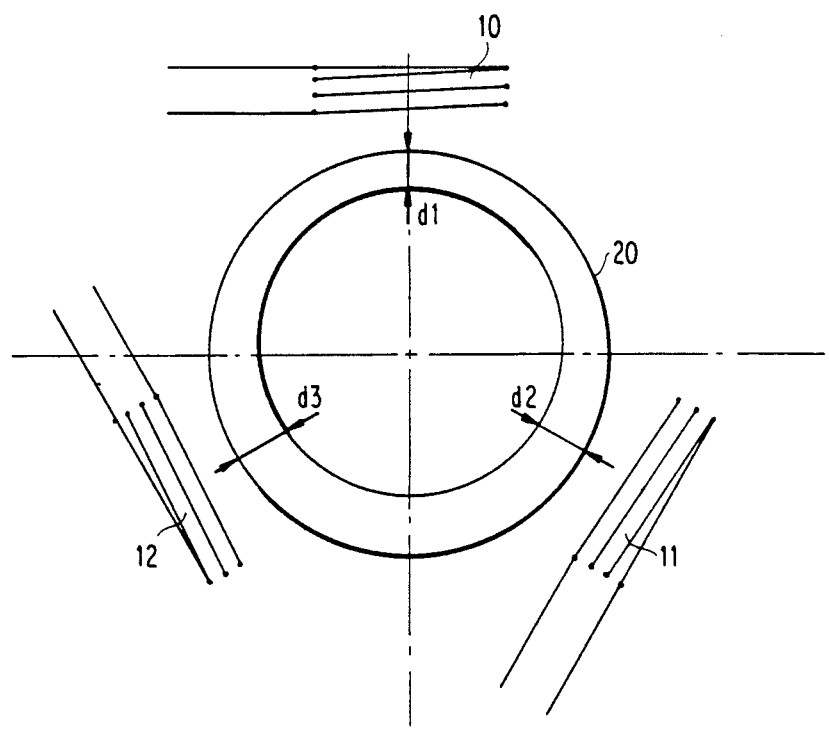
FIG. 15 is a schematic sectional view of an inventive system for measuring the mean wall thickness of a pipe and the eccentricity of the pipe.

FIG. 15 shows schematically how the inventive method can be used for measuring the mean wall-thickness of a pipe or tube and the eccentricity of the pipe wall. In this case, three coils 10, 11 and 12 are placed symmetrically around a pipe or tube 20 of irregular wall-thickness, at a constant radial distance from the pipe. When the pipe wall is essentially stationary about the longitudinal centre axis of the pipe, this constant distance can be obtained by holding the coils in a fixed position. If, on the other hand, the pipe is moved laterally during the process of its manufacture, the coils are conveniently mounted on wheel-carriages which run on the pipe.

By using three circuits according to FIG. 3 or FIG. 6 and connecting each circuit to a respective coil 10, 11, 12 and applying the principles described with reference to FIG. 5, it is possible to measure the thickness of that part of the pipe wall located in front of each respective coil. The sum of these thicknesses divided by three therewith constitutes the mean thickness of the pipe wall, whereas the differences between the thicknesses measured with the aid of the three coils constitutes a measurement of the eccentricity of the pipe wall.

Another important application of the invention resides in such cases as those when the material characteristics or properties of the electrically conductive material being measured vary from the outer surface(s) of the material inwards. Such variations may be due to variations in temperature throughout the material, e.g. in cases when the surface(s) is (are) radically cooled, or because the proportion of alloying substances at the surface(s) of the material is different to the proportion of said substances below the surface, e.g. due to liquation in the process of solidification. Variations of this kind can be of interest in material treatment processes, although it is extremely difficult to measure the extent of these variations with the aid of present day technology. The present invention enables the extent of such variations to be measured quite readily, by measuring the electrical conductivity of the material as the relationship between the integrals of the voltages that prevail between the time periods from time d to time f and time f to time e, in accordance with FIG. 5B. This procedure will provide the mean value of the electrical conductivity of the material from the surface of said material and inwardly thereof. It has been mentioned in the aforegoing that the sum of the integrated values from time d to time f and from time f to time e shall be constant. This does not apply in this particular case, since the value of the sum of the integrated values is instead an expression for different distribution of electrical conductivity and can be used to measure the conductivity gradient.

Although the electrical conductivity of the material is primarily contingent on its composition and its temperature, conductivity can also be contingent on inhomogeneties in the material, such as cracks, and the presence of non-conductive particles, such as slags. This enables the inventive method and measuring system to be used for discovering the presence of such faults, e.g. in the non-destructive testing of such materials.

When the electrically conductive material is magnetic, the picture of the voltage/time-lapse relationship used in the aforesaid no longer applies. This voltage/time-lapse relationship can still be studied, however, in order to provide some empirical knowledge concerning the dimensional parameters of the object and its properties. Notwithstanding this, however, it has been found that when the material is only weakly magnetic, e.g. when the magnetic permeability is less than 10, the method can be used essentially in the same manner as with non-magnetic materials.

The aforedescribed embodiments of the invention and their methods of application are non-limiting and have been given solely to exemplify the invention. Consequently, it will be understood that modifications can be made within the scope of the claims. For instance, the time points at which the induced voltage is analysed can be of any desired or required number and may have any desired or required location with regard to the particular application of the invention.

I claim:

1. A method for the contactless measuring of absolute parameter magnitudes of or relating to an electrically conductive material in solid or liquid form, such parameters comprising at least one of the distance of the conductive material from a given point, linear dimensions of a body that incorporates said material, the electrical conductivity of the material, and the temperature of said material, in which method an electromagnetic field is caused to penetrate the material at least partially, comprising:
   generating the electromagnetic field with the aid of a constant current which flows through at least one field generating coil;
   discontinuing the supply of current to said at least one coil subsequent to the magnetic field having penetrated the electrically conductive material to an extent sufficient for the intended parameter to be measured,
   sensing the voltage which is induced in at least one sensing coil located at said given point in the magnetic field as a result of the decaying magnetic field, said sensed voltage comprising an initial portion corresponding to the decay of the magnetic field across said distance parameter during an initial, very short time period on the order of microseconds beginning with the discontinuance of the current supply; and
   utilizing said initial portion of the sensed voltage to determine the absolute value of said distance parameter.

2. A method according to claim 1, characterized in using the field generating coil as the voltage sensing coil.

3. A method according to claim 1 or claim 2, characterized by analyzing the time variation of the induced voltage in order to determine the value of the measured magnitude.

4. A method according to claim 1, characterized by integrating the voltage which is induced in the sensing coil as a result of the decay of the non-penetrating part of the magnetic field and comparing the integral value with reference values such as to determine the linear distance of the conductive material from a given point on the field generating coil.

5. A method according to any of claims 1 or 2, characterized by analyzing the voltage which is induced in the sensing coil as a result of the decay of said penetrating part of the field and which prevails subsequent to substantially total decay of the non-penetrating part of said field, in order to determine given properties of the electrically conductive material or the linear dimensions between two mutually opposing sides of an object that contains said material.

6. A method according to claim 5, characterized by integrating the voltage induced in the sensing coil over a given period of time subsequent to substantially total decay of the non-penetrating part of said magnetic field, and comparing the integral value obtained with known reference values and/or with the value of the integral of said voltage over another given time period subsequent to substantially total decay of the non-penetrating part of said magnetic field, therewith to determine the electrical conductivity and/or the temperature of said material.

7. A method according to any of claims 1 or 2 when determining the thickness of a relatively thin body which consists of an electrically conductive material, characterized by causing part of the generated magnet field to propagate completely through said body, and analyzing the voltage which is induced in the sensing coil as a result of the decay of the completely penetrating part of said field, in order to measure the thickness of said body.

8. A method according to any of claims 1 or 2 for determining the differences in the value of a given parameter at a multiple of mutually different measuring locations, characterized by using a multiple of mutually identical series-connected coils for both generating said magnetic field and sensing the subsequent decay of said field; by supplying all coils with mutually the same constant current; and by sensing the differences between the voltages induced in respective coils.

9. A method according to any of claims 1 or 2, characterized by analyzing the variations in time of the voltage induced in said coil or coils in a plurality of separate time channels, for the purpose of determining the respective values of various parameters at one and the same time.

10. A measuring system for the contactless measuring of absolute parameter magnitudes of or related to an electrically conductive material in a solid or liquid form, such parameters comprising at least one of the distance of the material from a given point, linear dimensions of a body that contains such material, the electrical conductivity of said material or its temperature, with the aid of means which cause an electromagnetic field to penetrate the material at least partially, the system comprising:

at least one magnetic field generating coil,
at least one sensing coil dispensed at said given point,
first means connected for supplying a constant current to said at least one magnetic field generating coil,
second means for interrupting the current supplied by said first means to said at least one coil subsequent to said field having penetrated the material to an extent sufficient to measure the value of the intended parameter, and
third means for subsequently sensing the voltage which is induced in at least one sensing coil located at said given point in said magnetic field as a result of the decaying magnetic field subsequent to interruption of the supply current, said sensed voltage comprising an initial portion corresponding to the decay of the magnetic field across said distance parameter during an initial, very short time period on the order of microseconds beginning with the discontinuous of the current supply and said initial portion of said sensed voltage being used as a basis for determining the absolute value of said distance parameter.

11. A system according to claim 10, characterized in that the sensing coil (1; 10,11; 71,73) is also the magnetic-field generating coil.

12. A system according to claim 10 or claim 11, characterized by means (8,9; 86–89, 91) for analyzing variations of the sensed voltage in time.

13. A system according to any of the claims 10 or 11, characterized in that the system includes a multiple of separate measuring channels (86–89) for analyzing the variations in time of the voltage induced in the sensing coil (71) or coils, in order to measure the values of mutually different parameters substantially simultaneously.

14. A system according to any of claims 10 or 11, for determining the difference in values of one and the same parameters at several different measuring locations, characterized in that the system includes a multiple of mutually identical series-connected coils (10,11; 71,73) intended both for generating the magnetic field and for subsequently sensing the decaying magnetic field, and further includes means (6) for supplying the coils with the same constant current, and means (8,9,78,79) for sensing the difference between the values of the voltages induced in respective coils.

15. A method for the contactless measuring of absolute parameter magnitudes of or relating to an electrically conductive material in solid or liquid form, such parameters comprising at least one of the distance of the conductive material from a given point, linear dimensions of a body that incorporates said material, the electrical conductivity of the material, and the temperature of said material, in which method an electromagnetic field is caused to penetrate the material at least partially, comprising:

generating the electromagnetic field during at least a first period with the aid of a constant current which flows through at least one field generating coil;

discontinuing the supply of current to said at least one coil at the end of said first period, subsequent to the magnetic field having penetrated the electrically conductive material to an extent sufficient for the intended parameter to be measured, sensing the voltage which is induced in at least one sensing coil located in the magnetic field at said given point as a result of the decaying magnetic field, following said first period and during a second period, said sensed voltage comprising an initial portion corresponding to the decay of the magnetic field across said distance parameter during an initial, very short time period on the order of microseconds beginning with the discontinuance of the current supply; and utilizing said initial portion of the sensed voltage to determine the absolute value of said distance parameter.

16. The method of claim 15 wherein, said sensed voltage and said distance parameter are used to determine at least the conductivity of said material.

17. The method of claim 1 wherein said utilizing step comprises determining said distance parameter by measurement of said sensed voltage during a first period of time and determining other of said parameters by measurement of said sensed voltage during at least a second period of time following said first period of time.

18. The apparatus of claim 12 wherein said analyzing means comprises means for determining said distance parameter by measurement of said sensed voltage during a first period of time and for determining said other parameters by using said distance parameter and the measurement of said sensed voltage during at least a second period of time, following said first period of time.

19. A method according to claims 1 or 15, wherein said initial time period is 0.3–4.0 μs.

20. A system according to claim 10, wherein said initial time period is 0.3–4.0 μs.

* * * * *